Aug. 9, 1932.    M. O. SCHUR    1,870,655
COMPUTATION RULE
Filed May 12, 1927
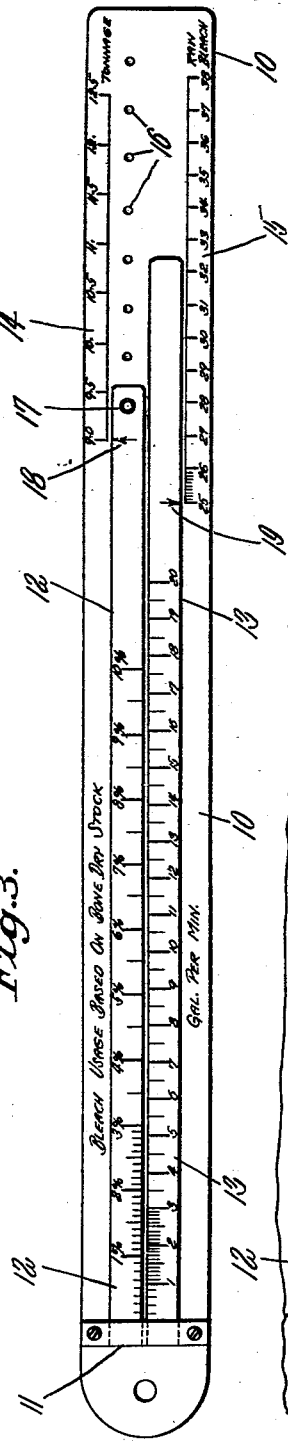
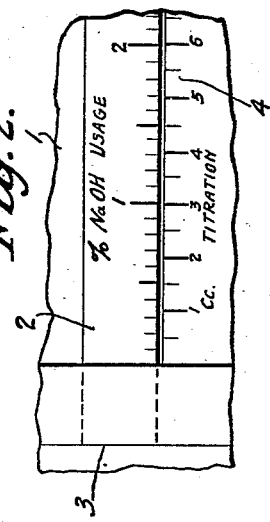
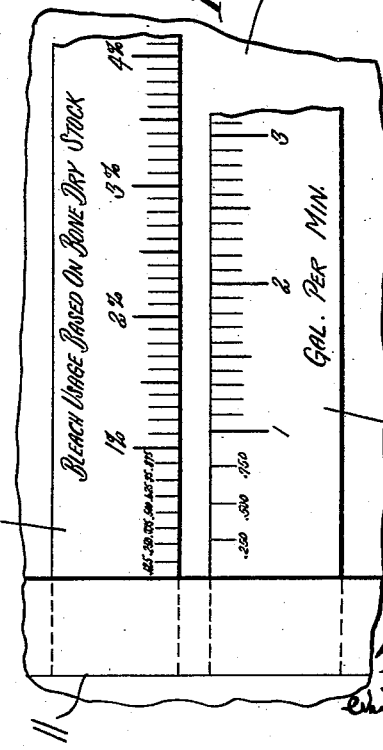
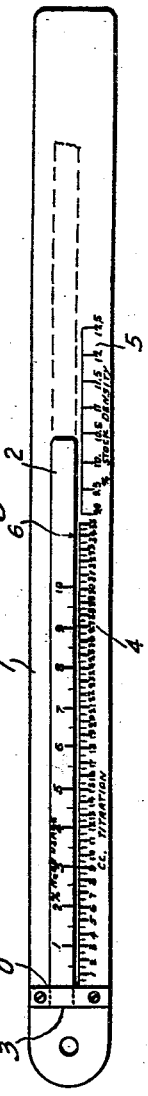

Patented Aug. 9, 1932

1,870,655

UNITED STATES PATENT OFFICE

MILTON O. SCHUR, OF BERLIN, NEW HAMPSHIRE, ASSIGNOR TO BROWN COMPANY, OF BERLIN, NEW HAMPSHIRE, A CORPORATION OF MAINE

COMPUTATION RULE

Application filed May 12, 1927. Serial No. 190,772.

This invention relates to computation rules, and has for its object to provide a rule which is simple in construction and which may be easily, rapidly, and accurately operated by untrained men.

In mill practice, it is sometimes necessary to solve equations of a certain general type a great many times, so that it becomes highly desirable to use a computation rule for such purpose. The average untrained mill operator, however, finds difficulty in using the usual slide rule for this purpose, particularly when certain of the factors in the equation are complex terms. Thus, it may be necessary to solve an equation involving three variables of the general type:

$$x = \frac{y}{z},$$

where $x$ is the unknown factor to be solved for, and where $y$ and $z$ are known factors which may be complex terms.

Similarly, it may be necessary to solve an equation involving four variables of the general type:

$$\frac{x}{w} = \frac{y}{z},$$

where $x$ is the unknown factor, and the others are known factors which may be complex terms.

The computation rule of the present invention is intended to enable the mill operator to solve equations such as hereinbefore given, quite readily and accurately. In brief, the rule of the present invention comprises one or more extensible scales and fixed scales preferably arranged in parallel, adjacent to one another and beginning at a common line or origin.

Where an equation of the general type:

$$x = \frac{y}{z}$$

is to be solved, the rule comprises a single, uniformly extensible, or stretchable linear scale fixed at one end and preferably corresponding to the unknown factor $x$. Adjacent and parallel to this scale are two fixed linear or substantially linear scales, one corresponding to the known factor $y$ and the other to the known factor $z$, and both having their origins in line with the origin of the extensible scale.

It is manifest that when $z$ equals unity and the same modulus is used for both the scales $y$ and $x$, the scale $y$, if superposed on the scale $x$, will coincide therewith. But when $z$ equals 2, the scale of $x$ must be extended to double its length if under any value of $y$ is still to be found the corresponding value of $x$. Similarly, if $z$ equals 2½, 3, or any number $n$, the scale of $x$ must be extended to 2½, 3 or $n$ times its initial length (i. e., the length when $z$ equals 1), in order that the corresponding value of $x$ may be found under any value of $y$. The insertion of a constant factor in the equation to change it to:

$$x = K\frac{y}{z}$$

merely requires that the modulus of one or more of the scales be changed according to convenience.

Where an equation of the general type $$\frac{x}{w} = K\frac{y}{z}$$

is being solved, the rule comprises two uniformly extensible linear scales, each fixed at one end, one corresponding to the unknown factor $x$, and the other to the known factor $y$. Adjacent and parallel to the scale $x$, is a fixed linear or substantially linear scale corresponding to the known factor $z$, and adjacent and parallel to the scale $y$ is a fixed linear or substantially linear scale coresponding to the factor $w$. When the scale $x$ is extended until a properly chosen mark upon it is opposite to the known factor on the scale $z$, and the scale $y$ extended until a predetermined mark upon it is opposite the known factor on the scale $w$, the distance from the origin to the unknown factor on scale $x$ is proportional to $x$ times $z$. Similarly, the distance from the origin to the known factor on scale $y$ is proportional to $w$ times $y$. The moduli of the scales having been correctly chosen, directly opposite the known factor on the scale $y$ will be found the unknown factor $x$.

With the foregoing and other features and objects in view, the invention preferably consists of the following construction, arrangement, and combination of parts, which will hereinafter be described in conjunction with the accompanying drawing, wherein Figure 1 illustrates a rule with a single extensible scale.

Figure 2 represents the lower end portion of the rule enlarged.

Figure 3 illustrates a rule with multiple extensible scales.

Figure 4 represents the lower end portion of the rule enlarged.

Referring to Figure 1 of the drawing, 1 indicates a base to one end of which an extensible scale 2 of substantially uniform elasticity is fixed, as by a clamp 3. The scale as shown, is preferably composed of elastic rubber, but, if desired, a uniform coil spring, lazy tongs, or other uniformly extensible means may be employed. Adjacent and parallel to the scale 2 are the fixed scales 4 and 5, which, as shown, are laid off on the base. The origin or zero point of all the scales lies on a line coinciding with the inner edge O of the clamp, that is, where the extensible scale 2 just begins to stretch.

This rule may be employed to solve an equation involving three variables, and finds utility, for example, in a pulp mill where a treatment of pulp with caustic soda solution is being performed to effect a solution of certain components from the pulp. To control such a treatment, it is necessary to determine the alkalinity of the pulp while being treated. For this purpose, the stock density or per cent. weight of dry fiber in the pulp is ascertained, and a definite volume of solution expressed from the pulp being treated is titrated with standardized acid. The alkalinity is then calculated, by the following equation:

$$N = KC\frac{100-D}{D}$$

where N equals per cent. caustic soda based on stock,

C equals cc. of standard acid used in titrating a definite volume of solution expressed from the pulp, D equals per cent. weight of dry fiber in the pulp, K equals a constant.

To this end, the extensible scale 2 corresponds to the linear variable N; the fixed scale 4 likewise corresponds to the known linear variable C; and the fixed scale 5 corresponds to $\frac{D}{100-D}$, which varies very nearly lineally throughout the range of stock densities employed in the treatment.

The operation of the rule is as follows. The end of the scale 2 is pulled or stretched until a certain point, such as an arrow 6 thereon, points to the graduation representing the stock density found in the pulp. On the stretched scale 2, whose graduations represent the value N, will now be found the per cent. caustic soda in the pulp, based on stock, directly opposite the graduation on the fixed scale 4 representing the number of cubic centimeters of standardized acid used in titrating the sample solution expressed from the pulp.

It is obvious that, since the scales 2 and 4 are linear and the scale 5 is very nearly linear, a stretch rule such as described is very easy for the untrained man to read. Furthermore, through the inclusion of the term $\frac{D}{100-D}$ as a single factory in scale 5, an additional important simplification is gained, for when a slide rule is used to compute N, not only do the logarithmic scales confuse the average mill operator, but the mental arithmetic involved in arriving at a value for $\frac{100-D}{D}$, before the final product is obtained, frequently leads to error. While it is possible to arrange a table with values of D at, say, the heads of columns, and values to C at the left ends of horizontal rows, nevertheless, in order to cover fully the ranges desired, it would be necessary to tabulate so many figures that, even though the operator were furnished with a guiding device of some sort, he would be apt to make mistakes.

Where four variables are involved in a calculation, a slide rule or table would be apt to lead to still greater confusion. A case of this sort arises in computing the gallons per minute of bleach liquor necessary to dose unbleached stock in a continuous process, where one must know the rate at which the stock is flowing through the system, the strength of the bleach liquor, and the per cent. bleach desired, based on stock.

If
P equals stock flow in terms of tons per 24 hours,
L equals per cent. bleach desired,
G equals strength of bleach liquor in grams available chlorine per liter,
then $$B = K\frac{PL}{G}$$

where
B equals gallons per minute of bleach liquor needed, and K is a constant.

A rule for solving for B in the foregoing equation is shown in Figure 4, where on a base 10 are clamped at 11 two uniformly extensible scales 12 and 13, the scale 12 corresponding to the factor L, and the scale 13 to the factor B. On the base adjacent to the scale 12 is laid off a scale 14, corresponding to P, and adjacent to the scale 13 a scale 15 corresponding to G. Preferably, the rule is provided with means for holding either or both of the extensible scales in position after stretching. As shown, this is accomplished by fixing a peg to the upper end of, say, the scale 12 and forming a series of openings in the base adjacent to the graduations on the scale 14, so that after stretching the scale, the peg may be inserted into the proper opening to hold the stretched scale in position. This rule is operated as follows. The operator stretches the scale 12 and sticks the peg 17 into one of the holes 16 so as to bring an arrow 18 on the scale 12 directly opposite the graduation on scale 14 corresponding to the rate of stock flow. He then stretches scale 13 until an arrow 19 thereon lies directly opposite the graduations on scale 15 corresponding to the strength of the bleach liquor at his disposal. He now finds on scale 13 directly opposite the per cent bleach desired on scale 12, the gallons of bleach liquor per minute necessary.

It is apparent that when the arrow 18 is brought opposite the graduation of P under consideration, and the arrow 19 opposite the predetermined scale graduation of G, then the distance from the origin to the desired value of L on scale 12 is proportional to PL. Similarly, the distance from the origin to the proper value of B on scale 13 is proportional to BG. The moduli of the scales having been correctly chosen, these distances are equal.

Having thus described certain embodiments of this invention, it should be obvious that various changes and modifications might be made without departing from the spirit or scope of invention as defined by the appended claims.

What I claim is:

1. A computation rule comprising a plurality of extensible scales in cooperative relation with one another, said scales each being fixed at one end and being freely extensible from said fixed end.

2. A computation rule comprisng a plurality of adjacent and parallel, uniformly extensible scales, fixed scales adjacent and parallel to said extensible scales, all said scales being in cooperative relation with one another and corresponding to substantially lineally varying factors and having a common line of origin, said extensible scales each being fixed at one end at said origin and being freely extensible from said fixed end.

3. A computation rule comprising a pair of adjacent and parallel extensible scales, each fixed at one end; a fixed scale adjacent and parallel to each of said extensible scales and to certain of whose graduations a point on the corresponding extensible scale may be brought by extending said corresponding extensible scale; said rule including means for holding one of said extensible scales in position after it has been extended.

4. A computation rule comprising a plurality of extensible scales and a plurality of fixed scales with which said extensible scales are in cooperative relation, said extensible scales each being fixed at one end and being freely extensible from said fixed end.

5. A computation rule comprising a base, a pair of adjacent scales of extensible material each fixed at one end to said base, a fixed scale on said base adjacent to each of said extensible scales and to certain graduations of which a point on the adjacent extensible scale may be brought by stretching said extensible scale, said rule including means for holding one of said extensible scales in position after stretching.

6. A computation rule comprising a base, a pair of adjacent scales of extensible material each fixed at one end to said base, a peg fixed to one of said scales at its free end, and a fixed scale on said base adjacent to each of said extensible scales and to certain graduations of which a point on the adjacent extensible scale may be brought by stretching said extensible scale, said base having a series of openings adjacent to the graduations of one of the fixed scales but beyond the free end of the corresponding extensible scale and into any of which said peg may be inserted to hold its rubber scale in position after stretching.

7. A computation rule comprising a base, a pair of adjacent scales of extensible material and having a uniform cross-section each fixed at one end to said base, and a fixed scale on said base adjacent to each of said extensible scales and to certain graduations of which a point on the adjacent extensible scale may be brought by stretching said extensible scale, all said scales corresponding to substantially lineally varying factors and having a common line of origin.

In testimony whereof, I have affixed my signature.

MILTON O. SCHUR.